United States Patent
Nees et al.

(10) Patent No.: US 11,548,339 B2
(45) Date of Patent: Jan. 10, 2023

(54) RELATIVE GUIDE DEVICE FOR A STEERING ARRANGEMENT ARRANGED ON THE WHEEL-CARRIER SIDE

(71) Applicant: Schaeffler Technologies AG & Co. KG, Herzogenaurach (DE)

(72) Inventors: Dominik Nees, Karlsruhe (DE); Michael Frey, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/259,703

(22) PCT Filed: Jul. 8, 2019

(86) PCT No.: PCT/DE2019/100637
§ 371 (c)(1),
(2) Date: Jan. 12, 2021

(87) PCT Pub. No.: WO2020/025083
PCT Pub. Date: Feb. 6, 2020

(65) Prior Publication Data
US 2021/0316585 A1     Oct. 14, 2021

(30) Foreign Application Priority Data

Aug. 1, 2018 (DE) ..................... 10 2018 118 615.0

(51) Int. Cl.
*B60G 7/00* (2006.01)
*B62D 7/06* (2006.01)

(52) U.S. Cl.
CPC .............. *B60G 7/003* (2013.01); *B62D 7/06* (2013.01); *B60G 2200/1442* (2013.01);
(Continued)

(58) Field of Classification Search
CPC ............ B60G 7/003; B60G 2200/1442; B60G 2200/44; B60G 2200/46;
(Continued)

(56) References Cited

U.S. PATENT DOCUMENTS 3,741,581 A     6/1973  Patrin et al.
4,610,461 A *   9/1986  Guzzetta .................. B62D 7/00
                                                    280/124.134
(Continued)

FOREIGN PATENT DOCUMENTS

CN       201484168 U       5/2010
CN       108382149 A  *    8/2018   .......... B60G 13/005
(Continued)

OTHER PUBLICATIONS

Hirschmann, Steering Device, Oct. 1, 2015, EPO, DE 102014004231 A1, Machine Translation of Description (Year: 2015).*

*Primary Examiner* — Paul N Dickson
*Assistant Examiner* — Matthew D Lee

(57) ABSTRACT

A relative guide device (1) for a steering arrangement (31) is arranged on the wheel-carrier side for the spatial guidance and maintenance of the relative spatial orientation of the steering arrangement (31) with respect to a vehicle body (40). At least one telescopic movement apparatus (2) for movably connecting the steering arrangement (31) is arranged on the wheel-carrier side to the vehicle body (40). A steering force transmission device (30) transmits a steering force to a wheel (R) of a vehicle having a relative guide device (1), and to a wheel suspension (50) for a vehicle.

8 Claims, 6 Drawing Sheets

(52) U.S. Cl.
CPC ...... *B60G 2200/44* (2013.01); *B60G 2200/46* (2013.01); *B60G 2204/1484* (2013.01); *B60G 2204/422* (2013.01); *B60G 2204/4232* (2013.01); *B60G 2206/1116* (2013.01); *B60G 2206/50* (2013.01); *B60G 2300/37* (2013.01); *B60G 2300/40* (2013.01); *B60G 2400/41* (2013.01)

(58) Field of Classification Search
CPC ...... B60G 2204/1484; B60G 2204/422; B60G 2206/12; B60G 2204/4232; B60G 2206/50; B60G 2300/37; B60G 2300/40; B60G 2400/41; B60G 2200/144; B62D 7/06; B62D 5/0418
See application file for complete search history.

(56) References Cited

U.S. PATENT DOCUMENTS

| | | | | |
|---|---|---|---|---|
| 6,293,579 | B1* | 9/2001 | Schaeff | B66F 11/044 180/209 |
| 2005/0017471 | A1* | 1/2005 | Kim | B62D 9/04 280/86.751 |
| 2006/0151968 | A1* | 7/2006 | Kim | B60G 7/02 280/86.757 |
| 2008/0157490 | A1* | 7/2008 | Hakui | B60G 7/006 280/5.521 |
| 2009/0206573 | A1* | 8/2009 | Merryman | B60G 1/00 280/124.134 |
| 2010/0075727 | A1* | 3/2010 | Goers | A01D 41/12 280/42 |
| 2014/0001724 | A1* | 1/2014 | Mehrgan | B62D 7/00 280/87.041 |
| 2021/0001946 | A1* | 1/2021 | Choi | B60G 3/20 |

FOREIGN PATENT DOCUMENTS

| | | | | | |
|---|---|---|---|---|---|
| CN | 108394243 | A | * | 8/2018 | ............. B60G 3/26 |
| CN | 109606495 | A | * | 4/2019 | ........... B62D 57/024 |
| CN | 208745675 | U | * | 4/2019 | ............. B60G 3/20 |
| DE | 1755633 | A1 | | 8/1971 | |
| DE | 9319878 | U1 | | 7/1994 | |
| DE | 102009021477 | A1 | * | 11/2010 | ............ B60G 7/006 |
| DE | 102014004231 | A1 | * | 10/2015 | ............. B60G 3/20 |
| DE | 102014004231 | A1 | | 10/2015 | |
| DE | 102016204081 | A1 | * | 9/2017 | ............. B60G 3/26 |
| DE | 102016211385 | A1 | | 12/2017 | |
| WO | 2014101756 | A1 | | 7/2014 | |

* cited by examiner

RELATIVE GUIDE DEVICE FOR A STEERING ARRANGEMENT ARRANGED ON THE WHEEL-CARRIER SIDE

CROSS-REFERENCE TO RELATED APPLICATIONS

This application is the U.S. National Phase of PCT Appln. No. PCT/DE2019/100637 filed Jul. 8, 2019, which claims priority to DE 10 2018 118 615.0 filed Aug. 1, 2018, the entire disclosures of which are incorporated by reference herein.

TECHNICAL FIELD

The disclosure relates to a relative guide device for a steering arrangement arranged on the wheel-carrier side and for the spatial guidance and maintenance of the relative spatial orientation of the steering arrangement to a vehicle body.

The disclosure further relates to a steering force transmission device for transmitting a steering force to a wheel of a vehicle and a wheel suspension for a vehicle, in particular a motor vehicle.

BACKGROUND

Usually, a steering movement on a steering wheel of a vehicle is transmitted from the steering wheel to the steerable wheels via a steering gear or a steering arrangement.

For this purpose, the steering gear is designed with shafts and joints as well as transmission ratios. A power-assisted steering element for so-called power steering may also be interposed.

In other words, in conventional chassis with independent wheel suspension, the steering movement is initiated via the steering wheel and a tie rod including a track lever in a wheel carrier. Furthermore, in these chassis, the steering axis is clearly defined by the fixed wheel-side articulation points.

From U.S. Pat. No. 3,741,581 A, it is known, for example, to use bevel wheels or a bevel gear to divert the steering torque in its direction and to ensure a direct introduction of torque to a wheel carrier.

The steering and wheel suspension unit is thus firmly connected to the frame. There is no guidance via wishbones, so there is a fixed steering axis which remains stationary during the steering process, apart from the compression along the steering axis.

The steering torque is transferred to the bevel gear, starting from the steering wheel, via a rigid shaft. Furthermore, there is a fixed connection between the bevel gear and the axle/wheel suspension so that no additional movement of the axle/wheel suspension relative to the bevel gear is possible.

Steering devices with curved wishbones are also known (see for example DE 10 2016 211 385 A1), which are multi-link wheel suspensions with wishbones which are arranged at different heights and have a specially curved shape.

As a result of the resolution of the wheel-side articulation points, a displacement of the wheel-side articulation points of all wishbones occurs during the steering movement. The result is a steering axis that moves perpendicular to the horizontal plane in the vehicle coordinate system.

The previous solution of introducing a steering torque into the wheel carrier includes a steering actuator and a lever system, consisting of an actuator link and toe link, which directs the torque to the wheel carrier.

Studies have shown that the effective torque that arrives at the wheel carrier depends greatly on the current steering angle. The effective torque refers to the torque on the wheel carrier that is initiated from the actuator via the lever system or lever kinematics.

Due to the lever kinematics and the different angular ratios, the effective torque drops significantly with increased wheel steering angles.

In FIG. 7, a wheel carrier with a wheel R according to the above embodiments is shown.

In FIG. 8, the effective torque (y-axis) is plotted against the steering angle (x-axis) in a diagram. It can be seen from this that, at high steering angles, from approx. +/−50°, the effective torque on the wheel carrier is too low to support the tire forces that arise in a driving situation. This limits the maximum steering angle that can be achieved.

In addition, the non-linear relationship between the steering angle and the actuator rotation angle (rotation of the steering motor output shaft) is shown in FIG. 9. This non-linear relationship entails a considerable amount of control effort.

From DE 10 2014 004 231 A1, a steering device is known which is used to pivot at least one steerable vehicle wheel which is spring-mounted on a suspension with respect to a chassis of a motor vehicle. The steerable vehicle wheel is rotatably mounted on a steering knuckle; furthermore, a servomotor is provided which has a rotatable output shaft, and wherein an articulated shaft is provided which is non-rotatably connected on the one hand to the output shaft of the servomotor and on the other hand supports a toothing that in engagement with a counter-toothing non-rotatably connected with the steering knuckle such that a rotation of the output shaft of the servomotor causes a rotation of the steerable vehicle wheel about the pivot axis.

DE 1 755 633 A describes a steering device for vehicles. The steering device refers to two steered wheels, which are mounted on the axle journal with steering knuckles.

From DE 93 19 878 U, a steering device is known which has a steering column which is detachably connected to an undercarriage joint assembly by a coupling device.

SUMMARY

It is desirable to disclose a relative guide device, a steering force transmission device and/or a wheel suspension which can be manufactured inexpensively and in a material-saving manner and which preferably produce(s) a high effective torque on the wheel carrier on the one hand and, advantageously, on the other hand, has/have a linear relationship between the actuator rotation angle and the wheel steering angle.

It is also desirable to compensate for the movement of the steering axis during the steering process.

In a first aspect, a relative guide device for a steering arrangement arranged on the wheel-carrier side and for the spatial guidance and maintenance of the relative spatial orientation of the steering arrangement to a vehicle body comprises at least one telescopic movement apparatus for movably connecting the steering arrangement arranged on the wheel-carrier side to the vehicle body. With the telescopic movement apparatus, it is also possible to compensate for any movements of the steering axis of a wheel suspension.

In this way, using the movement apparatus, a steering arrangement, for example, can be moved relative to a vehicle body in such a way that the spatial orientation or alignment of the steering arrangement to the vehicle body is always unchanged. In other words, the relative guide device can be displaced within a plane (for example X-Y plane) with the aid of the telescopic movement apparatus or can displace, in particular displace in a linear manner, a steering arrangement.

It is therefore also preferred that the relative guide device comprises the at least one telescopic movement apparatus for movably connecting the steering arrangement arranged on the wheel-carrier side to the vehicle body in a linear manner. The linearly movable connection can be implemented for example by means of a linear guide.

Furthermore, it is advantageous if the telescopic movement apparatus can be fastened with the first end thereof to a guide device of the relative guide device.

The first end of the movement apparatus can preferably be frictionally and/or interlockingly fastened to the guide device of the relative guide device.

The telescopic movement apparatus can advantageously be movably fastened, in particular can be fastened in an articulated manner, with the second end thereof to the steering arrangement.

It is also advantageous if a connecting part for forming a cylinder joint is arranged at the second end of the movement apparatus.

The telescopic movement apparatus advantageously comprises at least one extendable element and at least one slide bearing device, wherein the at least one extendable element is preferably guided in the at least one slide bearing device so as to be linearly movable.

It can also be provided that the relative guide device has a guide device for spatial guidance of the movement apparatus. By means of the guide device, it is possible to spatially guide the movement apparatus, which is preferably displaceable in one plane (for example in the X-Y plane). This means that preferably the guide device can also displace or guide the movement apparatus in one plane (for example the X-Y plane), but can also implement a guide along a further dimension (for example along the Z-axis). In this way, it is possible to move the movement apparatus in all three spatial directions with the aid of the guide device.

The guide device is advantageously designed as a parallelogram guide. Thus, the telescopic movement apparatus can be moved within a plane (for example the X-Y plane) by a greater distance. The parallelogram guide also allows pivoting within a plane (for example the X-Y plane), which increases the freedom of movement of the movement apparatus in a plane or in a movement plane.

Furthermore, it is advantageous if the movement apparatus is arranged on the guide device. This allows the movement apparatus to be moved on the basis of a movement of the guide device. Of course, this also applies in reverse.

The guide device preferably comprises at least one guide element which movably connects the telescopic movement apparatus to a vehicle body.

The guide device advantageously has at least one joint for compensating a relative movement of the telescopic movement apparatus with respect to a vehicle body.

The at least one joint is advantageously designed as a ball joint or at least as a swivel joint.

It is also favorable if the at least one joint is arranged at the first end of the at least one guide element.

Furthermore, it is advantageous if a second end of the at least one guide element of the guide device is connected to the telescopic movement apparatus, in particular is fastened to the at least one slide bearing device.

Furthermore, it can be provided that the guide device comprises at least one connecting element for fastening the telescopic movement apparatus to the at least one guide element.

The at least one connecting element is preferably arranged at the second end of the at least one guide element.

It is also advantageous if the at least one connecting element is connected to the at least one guide element via a swivel joint. In this way, the two elements can be rotated relative to one another in one plane (e.g. in an X-Y plane).

The features mentioned above are advantageously used to implement a parallelogram guide. This also applies favorably to the following features, which advantageously describe a parallelogram guide in a more concrete manner.

The guide device preferably comprises two guide elements and two connecting elements.

The connecting elements preferably connect the second ends of the two guide elements to one another in a rotatable manner.

It is also advantageous if a ball joint is arranged at each of the first ends of the guide elements and a swivel joint is arranged at each of the second ends of the guide elements.

The connecting elements advantageously connect the two guide elements to one another at their second end in such a way that the connecting elements are rotatable relative to the guide elements in one plane (e.g. in an X-Y plane) with the help of the swivel joints.

A second aspect comprises a steering force transmission device for transmitting a steering force to a wheel of a vehicle.

Reference is explicitly made to the fact that the features of the relative guide device, as mentioned under the first aspect, can be used individually or in combination with one another in the steering force transmission device.

In other words, the features mentioned above under the first aspect relating to the relative guide device can also be combined with further features under the second aspect.

A steering force transmission device for transmitting a steering force to a wheel of a vehicle preferably comprises:
  a steering arrangement arranged on the wheel-carrier side, which can be arranged on the steering axis of a vehicle wheel, and
  a steering force transmission shaft for transmitting the steering force from a steering force device arranged on the vehicle body to the steering arrangement.

Furthermore, it is preferred that the steering force transmission shaft is designed to be telescopic. In this way, a transmission of the steering force can be continuously ensured when the position of the steering axis and thus the position of the steering arrangement changes relative to the vehicle body.

It is also preferred if the steering force transmission shaft is designed as a Cardan shaft. This allows power to be transmitted despite the spatial movement of the steering force transmission shaft.

To compensate for irregularities in the Cardan shaft, the two Cardan joints preferably have the same bending angle. This is made possible in particular by the relative guide device.

Furthermore, it is advantageous if a housing part of the steering arrangement comprises a receptacle, into which a connecting part of the movement apparatus, in particular formed at the second end of the telescopic movement apparatus, is inserted to form a cylinder joint. The steering arrangement can thus be moved relative to the vehicle body and the steering arrangement can be moved relative to the movement apparatus by means of the cylinder joint.

Furthermore, it can be provided that the steering force transmission shaft comprises two joint forks, one of which is arranged on the steering arrangement, in particular to realize a cylinder joint, and the other on the steering force device.

The joint forks are advantageously positioned in one plane.

The steering arrangement is preferably designed as a steering gear or as at least one steering force actuator.

The steering gear is advantageously designed as a bevel gear.

It is advantageous here if the bevel wheels have palloid teeth.

It is also advantageous if a sensor for detecting the wheel rotation is arranged on the bevel gear, the axis of rotation of which forms the axis of rotation of the vehicle wheel.

A third aspect comprises a wheel suspension for a vehicle.

Reference is explicitly made to the fact that the features of the steering force transmission device, as mentioned under the second aspect, can be used individually or in combination with one another in the wheel suspension.

Reference is also made to the fact that the features of the relative guide device, as mentioned under the first aspect, can be used individually or in combination with one another in the wheel suspension.

In other words, the features mentioned above under the first and second aspect relating to the relative guide device and the steering force transmission device can also be combined with further features under the third aspect.

The wheel suspension for a vehicle, in particular for a motor vehicle, preferably comprises:
a wheel carrier, and
a relative guide device according to the first aspect.

Furthermore, it is preferred that the wheel suspension comprises either at least one steering force actuator or a steering force transmission device according to the second aspect.

In the case of a steering force transmission device or if a steering force transmission device is used, it is advantageous if the steering arrangement is designed as a steering gear and the steering arrangement of the steering force transmission device, which is arranged on the wheel-carrier side and which is preferably connected to the wheel carrier, is relatively rotatable with respect to the wheel carrier. The steering arrangement can thus always be guided to a vehicle body by means of the relative guide device with the same spatial orientation.

This is because, due to the relative rotation of the steering arrangement or the steering gear with respect to the wheel carrier and the arrangement of the relative guide device on the steering gear or on a housing part of the steering gear and on the vehicle body, the spatial orientation of the steering gear to the vehicle body remains the same; even though the wheel carrier rotates, moves up and down, and moves back and forth towards the vehicle body.

In the case of at least one steering force actuator or in the case of using at least one steering force actuator as a steering arrangement, it is preferred if the steering force actuator is arranged on the wheel carrier and is designed to be relatively rotatable with respect to the wheel carrier. The at least one steering force actuator can thus always be guided to a vehicle body with the aid of the relative guide device with the same spatial orientation.

This is because, due to the relative rotation of the steering force actuator with respect to the wheel carrier and the arrangement of the relative guide device on the steering force actuator or on a housing part of the steering force actuator and on the vehicle body, the spatial orientation of the steering force actuator to the vehicle body remains the same; even though the wheel carrier rotates, moves up and down, and moves back and forth towards the vehicle body.

Due to the relative guide device of the wheel suspension, it is now possible, on the one hand, to bring about a high effective torque on the wheel carrier and, on the other hand, preferably to ensure a linear relationship between the actuator rotation angle and the wheel steering angle.

Furthermore, the movement of the steering axis can also be compensated for during the steering process.

Furthermore, it is advantageous if a housing part of the steering arrangement comprises a receptacle, into which preferably one connecting part of the movement apparatus, in particular formed at the second end of the telescopic movement apparatus, is inserted to form a cylinder joint. The steering arrangement can thus be moved relative to the vehicle body and the steering arrangement can be moved relative to the movement apparatus by means of the cylinder joint.

A relative guide device for a steering arrangement may be arranged on the wheel-carrier side for the spatial guidance and maintenance of the relative spatial orientation of the steering arrangement to a vehicle body.

In this case, the relative guide device preferably ensures that the steering arrangement is guided with the same spatial orientation to the vehicle body.

The guidance with the same spatial orientation of the steering arrangement is understood in the present description to mean that the steering arrangement comprises, for example, a housing part, the spatial orientation of which is guided unchanged to the vehicle body. In other words, the guidance with the same spatial orientation of the steering arrangement is understood to mean that it cannot be spatially rotated, but that its normal vector, which is perpendicular to the housing part of the steering arrangement or on the steering arrangement, always remains oriented in the same direction.

The normal vector of the housing part or the steering arrangement is preferably aligned in the direction of the vehicle body, wherein the normal vector is advantageously aligned with the side of the vehicle body on which the relative guide device is arranged.

Advantageously, the steering arrangement comprises a bevel gear, which sits on top of a wheel carrier and is mounted accordingly, and which is preferably guided via a parallel guide (for example a parallelogram guide or a guide apparatus) with length compensation (movement apparatus) defined to the frame of a vehicle or to a vehicle body.

A double universal joint shaft (Cardan shaft) with integrated length compensation is preferably provided for the transmission of the torque that is used to steer a vehicle wheel. Due to the length compensation in the parallel guide and in the Cardan shaft via respective joints, it is possible to compensate for an elliptical path of the steering axis and to introduce the applied torque of a steering actuator (steering force actuator) directly into the wheel carrier.

By means of the defined guide kinematics of the housing parallel guide or the guide apparatus, it is preferably ensured that in addition to the angle on the steering actuator, the steering angle can be detected directly on the wheel carrier, which increases the measurement accuracy and thus allows more precise control of the wheel position.

In summary, it can be stated that the steering arrangement advantageously allows a direct torque introduction and at the same time only represents a slightly higher unsprung mass.

Furthermore, the arrangement solves the problem of too low effective torques and at the same time to increases controllability.

Due to the parallel guidance, the steering angle can be recorded directly by means of a steering angle sensor on the wheel carrier and compared with the angle of rotation of the actuator (steering force actuator) in order to increase the measurability.

A higher measurement accuracy also enables a more precise control to the desired steering angle.

Furthermore, the guide or safety apparatus of the steering arrangement in conjunction with the Cardan shaft preferably ensures stress-free operation of the system. Spring movements and simultaneous changes in the steering angle can also be compensated for.

BRIEF DESCRIPTION OF THE DRAWINGS

The steering arrangement is explained in more detail below using an exemplary embodiment in conjunction with the associated drawings. Schematically, it can be seen that.

DETAILED DESCRIPTION

In the description below, the same reference symbols are used for the same components.

Figure 1:
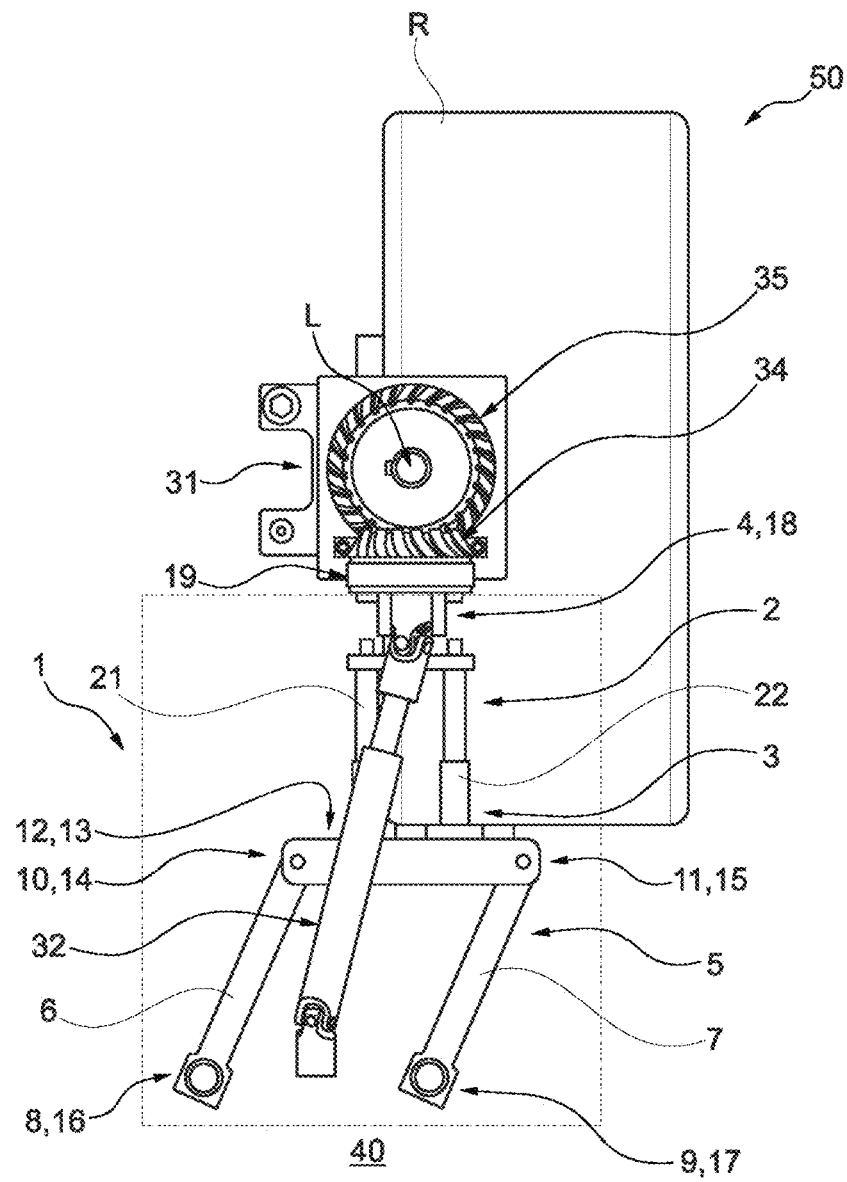
FIG. 1 shows a plan view of a relative guide device and a steering force transmission device on a wheel suspension.

FIG. 1 shows a plan view of a relative guide device 1 and a steering force transmission device 30 on a wheel suspension 50.

Figure 2:
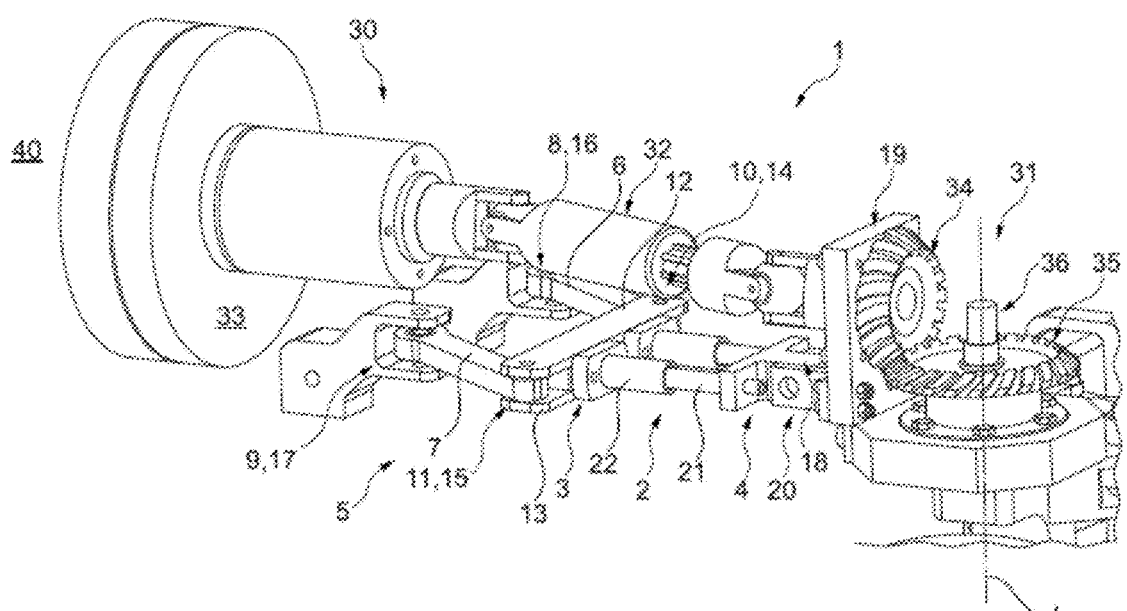
FIG. 2 shows a 3-dimensional view of FIG. 1.
Figure 3:
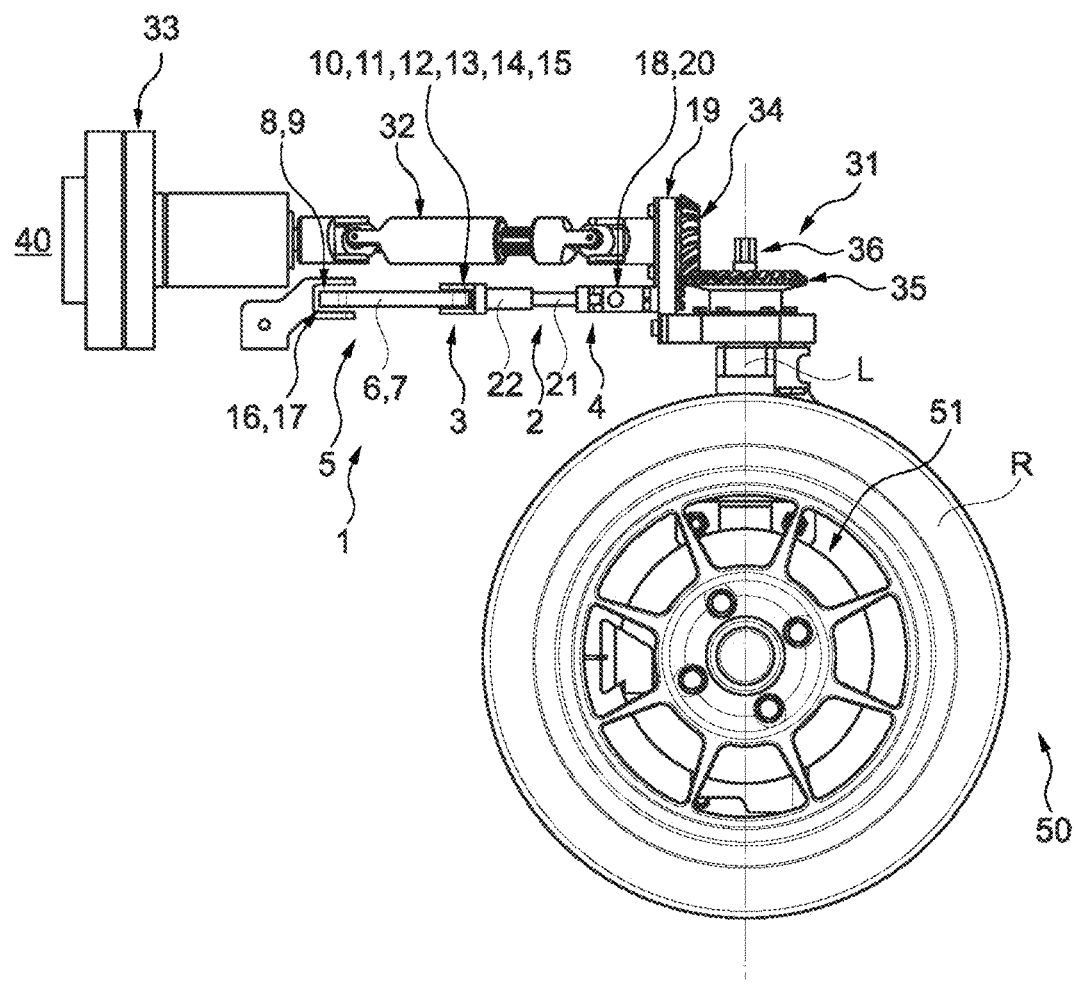
FIG. 3 shows a side view of FIG. 1 and FIG. 2, respectively.

Furthermore, FIG. 2 shows a 3-dimensional view of FIG. 1, wherein FIG. 3 shows a side view of FIGS. 1 and 2, respectively.

For the sake of simplicity and brevity, FIGS. 1 to 3 are described together below.

Shown in more detail, FIGS. 1 to 3 show a wheel suspension 50 for a vehicle, in particular for a motor vehicle.

Here, the wheel suspension 50 comprises a wheel carrier 51, a relative guide device 1 and a steering force transmission device 30.

Briefly summarized previously to provide an overview, according to FIGS. 1 to 3, a steering arrangement 31 of the steering force transmission device 30, which is arranged on the wheel-carrier side and connected to the wheel carrier 51, is formed to be relatively rotatable with respect to the wheel carrier 51. The steering arrangement 31, formed as a steering gear 31, can thus always be guided to a vehicle body 40 by means of the relative guide device 1 with the same spatial orientation.

Explained more specifically, the relative guide device 1 serves to spatially guide the steering gears 31 arranged on the wheel-carrier side in such a way that the relative spatial orientation of the steering gear 31 to a vehicle body 40 (only indicated as a reference symbol) can be maintained.

Maintaining the spatial orientation of the steering gear 31 with respect to a vehicle body 40 is preferably understood here to mean that the steering gear comprises, for example, a housing part 19, the spatial orientation of which is guided unchanged to the vehicle body 40.

In other words, maintaining the spatial orientation of the steering gear 31 is understood to mean that it cannot be spatially rotated, but rather that its normal vector, which is perpendicular to the housing part 19 of the steering gear 31, always remains oriented in the same direction.

Here, the normal vector of the housing part 19 is aligned in the direction of the vehicle body 40, wherein the normal vector is aligned with the side of the vehicle body 40 on which the relative guide device 1 is arranged.

According to FIGS. 1 to 3, the relative guide device 1 has a telescopic movement apparatus 2 for movably connecting the steering gear 31 arranged on the wheel-carrier side to the vehicle body 40.

As can easily be seen from the figures, the telescopic movement apparatus 2 has a first end 3 and a second end 4.

Here, the telescopic movement apparatus 2 is interlockingly fastened with the first end 3 thereof to a guide apparatus 5 of the relative guide device 1.

At the second end 4 thereof, however, it is movably fastened to the steering gear 31. In the present case, this is achieved, among other things, in that a connecting part 18 for forming a cylinder joint is arranged at the second end 4 of the movement apparatus 2.

It can also be seen from FIGS. 1 to 3 that the telescopic movement apparatus 2 comprises two extendable elements 21 and two slide bearing apparatus 22, wherein each extendable element 21 is guided so as to be linearly movable in a slide bearing apparatus 22.

As already indicated, the relative guide device 1 has a guide apparatus 5 for spatial guidance of the movement apparatus 2.

In the present case, the guide apparatus 5 is designed as a parallelogram guide.

As can also be seen from FIGS. 1 to 3, the movement apparatus 2 is arranged on the guide apparatus 5, wherein the guide apparatus 5 comprises two guide elements 6, 7. The guide elements 6, 7 movably connect the telescopic movement apparatus 2 to the vehicle body 40.

In the present case, this is achieved in that the guide apparatus 5 has two joints 16, 17 for compensating a relative movement of the telescopic movement apparatus 2 with respect to a vehicle body 40.

The joints 16, 17 are designed as ball joints, wherein each joint 16, 17 is arranged at the first end 8, 9 of a guide element 6, 7.

Furthermore, FIGS. 1, 2 and 3 show that a second end 10, 11 of a guide element 6, 7 of the guide apparatus 5 is fastened to the telescopic movement apparatus 2 or to the slide bearing apparatus 22.

For this purpose, the guide apparatus 5 has two connecting elements 12, 13 for fastening the telescopic movement apparatus 2 to the guide elements 6, 7, wherein each connecting element 12, 13 is arranged at a second end 10, 11 of the guide elements 6, 7.

More precisely, the connecting elements 12, 13 are each connected to the respective or corresponding guide element 6, 7 via a swivel joint 14, 15.

For the sake of simplicity, the above explanations are briefly summarized again below.

As can be seen from FIGS. 1 to 3, the guide apparatus 5 comprises two guide elements 6, 7 and two connecting elements 12, 13, wherein the connecting elements 12, 13 connect the second ends 10, 11 of the two guide elements 6, 7 to one another in a rotatable manner.

Furthermore, a ball joint 16, 17 is arranged at each of the first ends 8, 9 of the guide elements 6, 7 and a swivel joint 14, 15 is arranged at each of the second ends 10, 11 of the guide elements 6, 7.

Furthermore, the connecting elements 12, 13 are connected to the guide elements 6, 7 at their second end 10, 11 in such a way that the connecting elements 12, 13 are rotatable relative to the guide elements 6, 7 by means of swivel joints 14, 15.

As already mentioned at the outset of the description of the figures, FIGS. 1 to 3 also show a steering force transmission device 30 for transmitting a steering force to a wheel R of a vehicle.

The steering force transmission device 30 has a steering gear 31 arranged on the wheel-carrier side, which is arranged on the steering axis L of a vehicle wheel R, and a steering force transmission shaft 32 for transmitting the steering force from a steering force apparatus 33 arranged on the vehicle body 40 to the steering gear 31.

As can be seen from FIGS. 1 to 3, the steering force transmission shaft 32 is designed to be telescopic in order to continuously ensure a transmission of the steering force when the position of the steering axis L and thus the steering gear 31 changes relative to the vehicle body 40.

Specifically, the figures show that the steering force transmission shaft 32 is designed as a Cardan shaft, wherein the two Cardan joints have the same bending angle for compensating for irregularities in the Cardan shaft 32.

FIGS. 1 to 3 also show that a housing part 19 of the steering gear 31 comprises a receptacle 20, into which a connecting part 18 of the movement apparatus 2 is inserted to form a cylinder joint.

Shown in more detail, the receptacle 20 is formed at the second end 4 of the telescopic movement apparatus 2.

In addition, the steering force transmission shaft 32 has two joint forks, one of which is arranged on the steering gear 31 and the other on the steering force apparatus 33. Both joint forks are designed in such a way that they lie in one plane.

As already indicated, the steering gear 31 is designed as a bevel gear, wherein the bevel wheels 34, 35 have a palloid toothing.

Furthermore, a sensor 36 (only indicated as a reference symbol) for detecting the wheel rotation is arranged on the bevel gear wheel 35, the axis of rotation L of which forms the axis of rotation of the vehicle wheel R.

Finally, it should also be mentioned that, as an alternative to the force transmission device 30, it is also possible for the wheel suspension 50 to have a steering force actuator (not shown).

In such a case, the steering force actuator is arranged on the wheel carrier 51 and is designed to be relatively rotatable with respect to the wheel carrier 51, so that the steering force actuator can always be guided with the same spatial orientation to a vehicle body 40 by means of the relative guide device 1.

In the end, the steering force actuator differs from an alternative to a steering gear in that the steering force is generated directly on the wheel carrier and does not have to be transferred to the wheel carrier.

FIGS. 1 to 3 are described again below, but in other words.

In FIGS. 1 to 3, the concept of a steering system or wheel suspension 50 for a vehicle, in particular for a motor vehicle, is shown.

On the right-hand side (see in particular FIGS. 2 and 3), the steering force apparatus 33 is attached to the vehicle or to the body 40 in a fixed manner to the frame.

Starting from this actuator or the steering force apparatus 33, a double universal joint shaft, or Cardan shaft for short, with integrated length compensation is used for transmitting the torques.

Furthermore, it is favorable if the two inner joint forks lie in one plane.

If these prerequisites are met structurally, the angle error is compensated and the torque can be passed on to the wheel carrier 51 without fluctuations.

The illustrated steering gear 31 including the bevel gear stage is responsible for the direct introduction of the torque into the wheel carrier 51.

The bevel gear stage is necessary in the present design so that the torque can be deflected by 90° in its effective direction.

The steering gear 31 is fully supported by means of suitable components. Shown in particular in FIGS. 2 and 3, a receptacle 20 for the relative guide device 1 is located at the left end of the housing part 19.

The cylinder joint, realized by the receptacle 20 and the connecting part 18, ensures that the entire system can compensate for the compression and rebound movement.

A further compensation of an angular movement (camber on the wheel R during the steering process) can be omitted, since the kinematics of the wheel suspension 50 result in a camber-free movement during the steering process.

A tooth system was selected for the toothing of the bevel wheels, which is characterized by a high degree of overlap and smooth running.

The use of two double-row angular contact ball bearings (not shown) as bearings for the bevel wheels 34, 35 can be optimally reconciled with the available installation space.

The bearing seat is located directly on the shaft journal of the wheel carrier 51, on which the torque is introduced.

Another aspect in the implementation of the steering system or the wheel suspension 50 is the guidance of the steering gear 31 to the frame or to the vehicle body 40.

This must ensure that the rear wall of the housing or the housing part 19 is guided parallel to the frame connection/to the vehicle body 40. As already mentioned several times in the present description, such a guidance is implemented by the relative guide device 1.

Because of the constant spatial orientation of the housing part 19, it is ensured that the steering angle can be determined directly via the shaft journal of the wheel carrier 51.

FIG. 1 is briefly described again below.

FIG. 1 shows the components of the wheel suspension 50, the relative guide device 1 and the steering force transmission device 30.

Here, the relative guide device 1 consists of a guide apparatus 5, which subsequently guides a length-variable or telescopic movement apparatus 2, which helps to compensate for the movement of the steering axis.

Through the connection to the gear housing or to the housing part 19 of the steering gear via a cylinder joint, the wheel stroke movement is also secured.

Furthermore, the length variability is implemented by means of two rods or extendable elements 21 which are attached to the parallel guide or to the guide apparatus 5 via sliding bushings or slide bearing apparatus 22.

The parallel guide or the relative guide device 1 has two ball joints for realizing the wheel stroke movement.

Cylinder joints are used towards the wheel carrier 51, since the wheel stroke movement is not yet to be compensated for at this point.

The steering force transmission shaft 32 itself has a splined shaft profile for transmitting the torques and two universal joints which allow the torques to be diverted by a certain angle.

The required length variability of the steering force transmission shaft 32 results from the kinematics of the steering axis, and thus from the kinematics of the wheel suspension 50.

Figure 4:
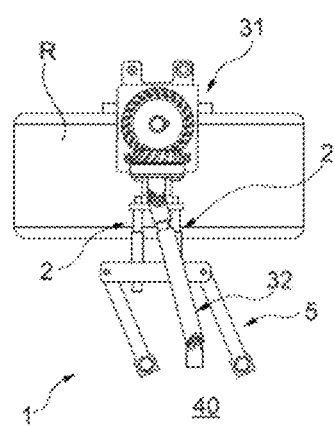
FIG. 4 shows a plan view of the relative guide device, the steering force transmission device and the wheel suspension with a first steering angle.

FIG. 4 shows a plan view of the relative guide device 1, the steering force transmission device 30 and the wheel suspension 50 with a first steering angle.

Figure 5:
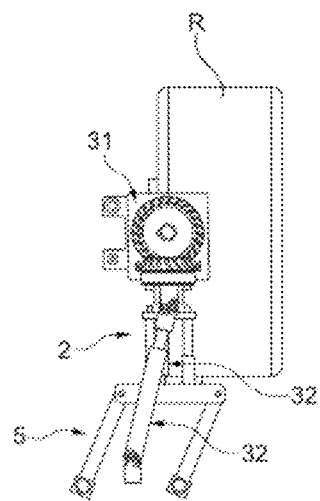
FIG. 5 shows a plan view of the relative guide device, the steering force transmission device and the wheel suspension with a second steering angle.

In contrast, FIG. 5 shows a plan view of the relative guide device 1, the steering force transmission device 30 and the wheel suspension 50 with a second steering angle.

Figure 6:
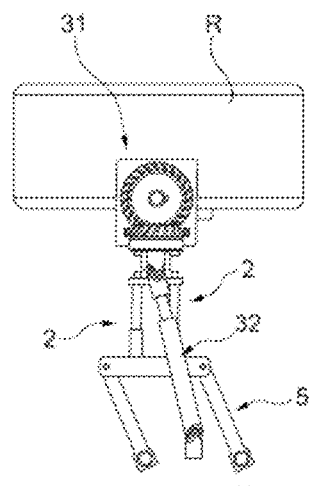
FIG. 6 shows a plan view of the relative guide device, the steering force transmission device and the wheel suspension with a third steering angle.

And FIG. 6 shows a plan view of the relative guide device 1, steering force transmission device 30 and wheel suspension 50 with a third steering angle.

Starting from FIG. 5, the wheel R is rotated clockwise in order to bring it into the position shown in FIG. 4, whereas a counterclockwise rotation brings the wheel R into the position according to FIG. 6.

With the help of the presented relative guide device 1, the steering force transmission device 30 and the wheel suspension 50, it is possible to park a vehicle in a simple manner perpendicular to an existing parking space.

Furthermore, it is also possible to turn a vehicle, in particular an automobile, on the spot.

It is also possible to continuously configure the steering angle of a wheel R to the left and/or right so that the wheel positions, as shown in FIGS. 4, 5 and 6, can be assumed from normal driving of a vehicle. In this way, the road traffic is minimally disturbed or impaired.

Figure 7:
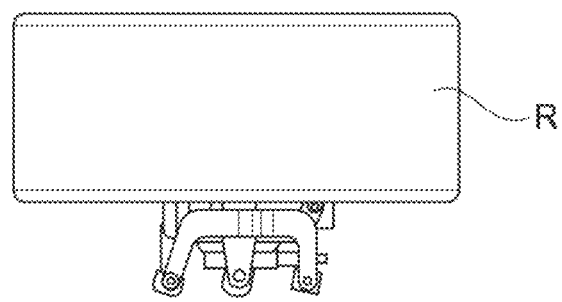
FIG. 7 shows a plan view of a wheel suspension from the prior art.
Figure 8:
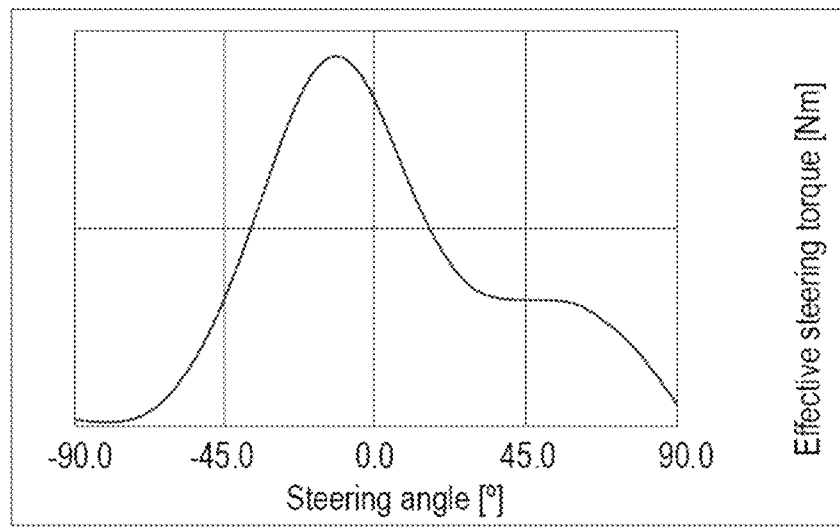
FIG. 8 shows a diagram to illustrate the steering torque of the wheel suspension or of the wheel from FIG. 7 with respect to the steering angle.
Figure 9:
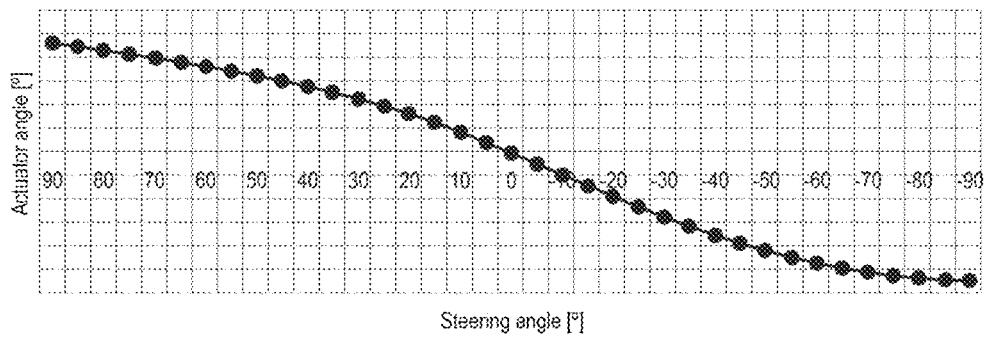
FIG. 9 shows a diagram to illustrate the actuator angle of the wheel suspension or of the wheel from FIG. 7 with respect to the steering angle.

Finally, it should also be mentioned that FIG. 7 shows a plan view of a wheel suspension from the prior art, FIG. 8 shows a diagram to illustrate the steering torque of the wheel suspension or of the wheel from FIG. 7 with respect to the steering angle, and FIG. 9 shows a diagram to illustrate the actuator angle of the wheel suspension or of the wheel from FIG. 7 with respect to the steering angle.

FIGS. 7, 8 and 9 were already explained at the outset of the description.

LIST OF REFERENCE SYMBOLS

1 Relative guide device
2 Telescopic movement apparatus
3 First end of the movement apparatus
4 Second end of the movement apparatus
5 Guide apparatus
6 Guide element
7 Guide element
8 First end of the guide element
9 First end of the guide element
10 Second end of the guide element
11 Second end of the guide element
12 Connecting element
13 Connecting element
14 Swivel joint
15 Swivel joint
16 Ball joint
17 Ball joint
18 Connecting part
19 Housing part of the steering gear/steering arrangement
20 Receptacle
21 Extendable element
22 Slide bearing apparatus
30 Steering force transmission device
31 Steering arrangement/steering gear
32 Steering force transmission shaft/Cardan shaft
33 Steering force apparatus
34 Bevel gear wheel
35 Bevel gear wheel
36 Sensor
40 Vehicle body
50 Wheel suspension
51 Wheel carrier
L Steering axis
R Vehicle wheel

The invention claimed is:

1. A relative guide device for a steering arrangement arranged on a wheel-carrier side and for spatial guidance and maintenance of a relative spatial orientation of the steering arrangement with respect to a vehicle body, the relative guide device comprising:
   a guide apparatus configured to move a first connecting element relative to the vehicle body, wherein the guide apparatus is a parallelogram guide; and
   a telescopic movement apparatus configured to movably connect the steering arrangement arranged on the wheel-carrier side to the first connecting element.

2. The relative guide device according to claim 1, wherein the telescopic movement apparatus comprises at least one extendable element and at least one slide bearing apparatus, wherein the at least one extendable element is guided in the at least one slide bearing apparatus so as to be linearly movable.

3. The relative guide device according to claim 1,
   wherein the guide apparatus comprises two guide elements,
   wherein each of the two guide elements is connectable to the vehicle body by a first joint and connected to the first connecting element by a second joint, and
   wherein one of the first and second joints is a ball joint and another of the first and second joints is a swivel joint.

4. The relative guide device according to claim 1,
   wherein the guide apparatus comprises two guide elements, the first connecting element, and a second connecting element,
   wherein a ball joint is arranged at a first end of each of the guide elements and a swivel joint is arranged at a second end of each of the guide elements, and
   wherein the connecting elements connect the two guide elements to one another at the second end thereof in such a way that the connecting elements are rotatable relative to the guide elements by means of the swivel joints.

5. A steering force transmission device for transmitting a steering force to a wheel of a vehicle, the steering force transmission device comprising:
   a steering arrangement which is arranged on a wheel-carrier side and which moves with a steering axis of a vehicle wheel relative to a vehicle body, a steering force transmission shaft for transmitting the steering force from a steering force apparatus arranged on the vehicle body to the steering arrangement, and a relative guide device according to claim 1, wherein the steering force transmission shaft is designed to be telescopic in order to continuously ensure a transmission of the steering force when a position of the steering axis and thus the steering arrangement changes relative to the vehicle body, wherein the steering force transmission shaft is designed as a Cardan shaft, wherein two Cardan joints of the Cardan shaft have a same bending angle, and wherein a housing part of the steering arrangement is connected to the relative guide device by a cylinder joint.

6. The steering force transmission device of claim 5:

wherein the steering force transmission shaft comprises two joint forks, one of which is arranged on the steering arrangement and the other on the steering force apparatus, and wherein the joint forks are positioned in a plane.

7. The steering force transmission device of claim 5:

wherein the steering arrangement is a steering gear, and wherein the steering gear is a bevel gear.

8. The steering force transmission device of claim 7, further comprising a sensor for detecting a wheel rotation arranged on a bevel gear wheel, an axis of rotation of which forms an axis of rotation of the vehicle wheel.

* * * * *